(12) United States Patent
Albinger et al.

(10) Patent No.: US 6,435,405 B1
(45) Date of Patent: Aug. 20, 2002

(54) METHOD AND SYSTEM FOR IDENTIFYING AND HANDLING CRITICAL CHIP CARD COMMANDS

(75) Inventors: Elmar Albinger, Schoenaich; Peter Bendel, Boeblingen; Thomas Schaeck, Achern, all of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/443,380

(22) Filed: Nov. 22, 1999

(30) Foreign Application Priority Data

Nov. 23, 1998 (DE) .......................................... 198 53 730

(51) Int. Cl.⁷ .............................................. G06F 17/00
(52) U.S. Cl. ........................ 235/375; 235/370; 235/379; 235/380
(58) Field of Search ................................ 235/375, 370, 235/380, 379

(56) References Cited

U.S. PATENT DOCUMENTS

| | | | | |
|---|---|---|---|---|
| 4,910,775 A | * | 3/1990 | Yves et al. ............... | 235/379 X |
| 5,034,596 A | * | 7/1991 | Utsunomiya ................ | 235/380 |
| 5,191,611 A | * | 3/1993 | Lang ........................... | 380/25 |
| 5,461,217 A | * | 10/1995 | Claus ......................... | 235/380 |
| 5,770,844 A | * | 6/1998 | Henn .......................... | 235/380 |
| 5,796,831 A | * | 8/1998 | Paradinas et al. ........ | 235/380 X |
| 5,811,771 A | * | 9/1998 | Dethloff ...................... | 235/380 |
| 6,016,963 A | * | 1/2000 | Ezawa et al. ................ | 235/492 |
| 6,018,724 A | * | 1/2000 | Arent .......................... | 705/44 |
| 6,038,551 A | * | 3/2000 | Barlow et al. .......... | 235/380 X |
| 6,095,412 A | * | 8/2000 | Bertina et al. .............. | 235/380 |
| 6,105,008 A | * | 8/2000 | Davis et al. ............ | 235/375 X |

* cited by examiner

Primary Examiner—Michael G. Lee
Assistant Examiner—Daniel Walsh
(74) Attorney, Agent, or Firm—Louis P. Herzberg; Anne Vachon Dougherty

(57) ABSTRACT

A device and method for identifying critical card commands and their execution on the chip card. Each card command to be executed is supplied prior to its execution to a comparison device, which can either be a component of the chip card reader or a component independent of this. The comparison device checks with reference to filed comparison samples whether a critical card command is involved. A special comparison process is used for this. If the card command to be executed is a critical card command, it must be additionally confirmed by the user for it to be executed. A particular form of execution consists in comparison samples for identifying critical card commands being deposited during manufacture of the chip card and these being loaded into the working memory of the chip card reader or the comparison device on initialisation of the chip card in the chip card reader.

28 Claims, 4 Drawing Sheets

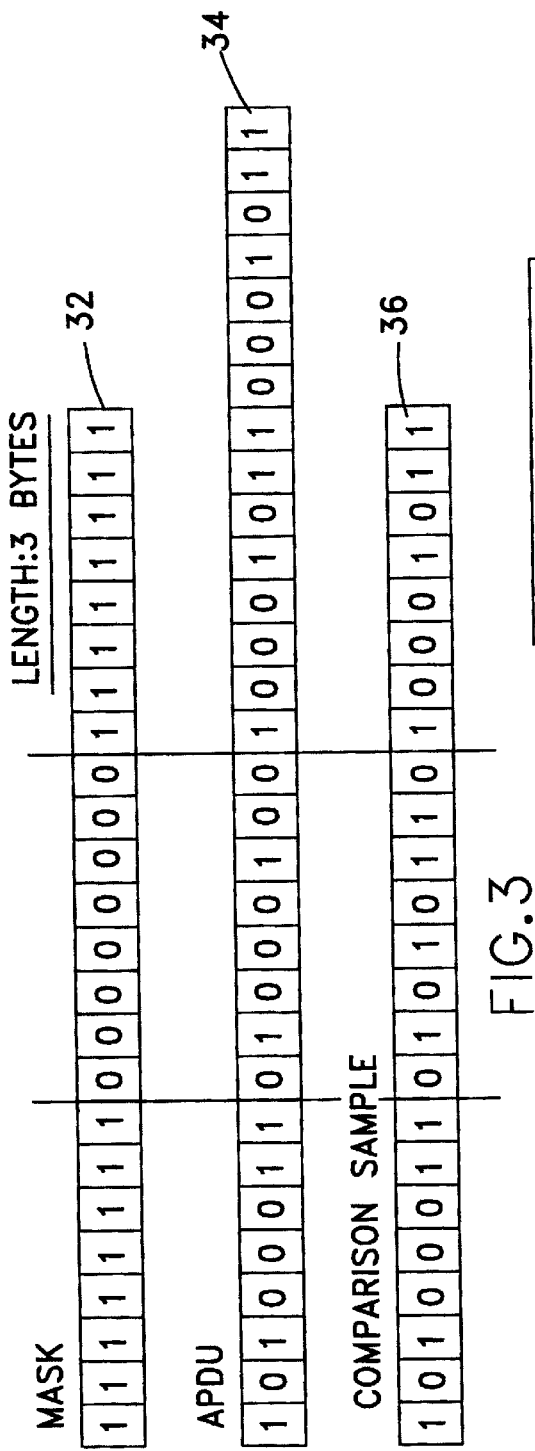
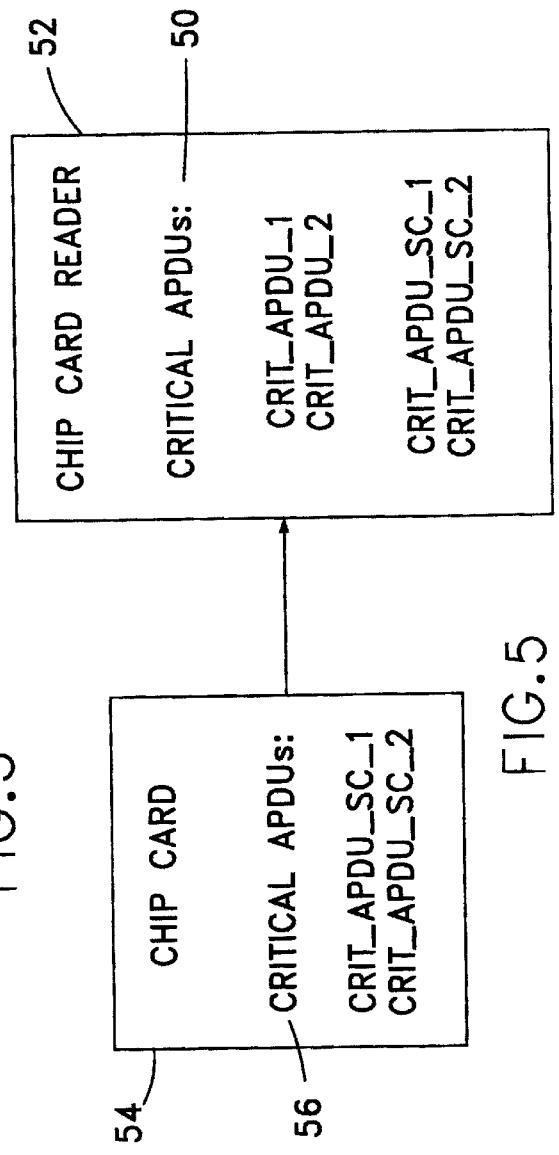

METHOD AND SYSTEM FOR IDENTIFYING AND HANDLING CRITICAL CHIP CARD COMMANDS

FIELD OF THE INVENTION

The present invention describes a method and a device for identifying and handling critical chip card commands (card commands), which are to be executed on a chip card.

BACKGROUND OF THE INVENTION

Most of the chip card readers available on the market have a simple reader command, by means of which any card commands (APDUs) can be transmitted to the card. The card command is executed in the chip card 16 of FIG. 1 and a reply is sent back to the chip card reader 14. The chip card reader transmits the reply of the chip card to the application 12.

In many applications, in particular payment applications, it is desirable for the chip card reader to forward certain card commands (i.e., critical card commands) to the chip card for execution only if defined conditions exist. This applies, for example, to applications for the electronic debiting of money by means of a banking chip card. This is not currently possible using ordinary chip card readers, as they do not have this kind of functionality. If the chip card reader is connected for example to a PC, which in turn has a connection to the internet, it is possible for a virus in the PC to use the chip card reader to send any commands to the card and initiate any transactions in the name of the card holder.

Examples of such transactions may be payment instructions or other declarations of intent (e.g., by means of digital signature) in the name of the card holder. However, the requirements of such chip card applications (for example German signature law) demand, with regard to the avoidance of misuse, that the transactions displayed to the user correspond to the transactions actually carried out with the card. Conventional chip card readers cannot satisfy these requirements.

An object of the present invention is therefore to provide a method and a device which identifies certain card commands (so-called critical card commands) and only releases them for execution on the chip card if certain events are present, without the chip card application itself having to or being able to exert influence on this process.

SUMMARY OF THE INVENTION

In accordance with the present invention, the chip card reader preferably contains a comparison device for identifying the critical card commands. Another implementation may consist in the fact that the comparison device is connected, in incoming or outgoing series, to the chip card reader. The comparison device checks the card commands to be executed for critical card commands and ensures that critical card commands are only executed if a user-defined condition, e.g. pressing of the confirmation key, has occurred. Templates with the critical card commands are preferably held for classification in the comparison device (e.g. in an EEPROM module) against which templates each card command to be executed is to be compared.

BRIEF DESCRIPTION OF THE INVENTION

The present invention is described in greater detail with reference to several practical samples in connection with the appended drawings wherein:

FIG. 3 shows a special execution variant of the filter function in accordance with FIG. 2;

FIG. 5 shows a further execution variant of the filter function in accordance with FIG. 2.

DETAILED DESCRIPTION OF THE INVENTION

The advantages of the present invention hie in the fact that the chip card reader or the comparison device (filter function) automatically recognizes critical commands and only forwards these to the chip card for execution in the event of confirmation by the user. Since the comparison process for the chip card application is carried out transparently, the chip card reader can be used at any time alternatively to a conventional chip card reader.

The chip card application does not have to use any chip card- reader-specific commands and cannot circumvent the wait for confirmation of security-relevant card commands either. Some chip card readers have special commands for using Key/Display. These can be used to have a given card command modified by the chip card reader, depending on a user entry at the chip card reader, before it is sent to the card. Alternatively, a request for confirmation can be generated before the card command is sent.

The basic inventive principle consists in the fact that the chip card reader preferably contains a filter function (preferably embodied in a reader comparison device), which identifies certain, critical card commands and delays them (preferably in the volatile memory of the chip reader) until a defined event, e.g. pressing of a-confirmation key, occurs. The occurrence of the event releases the execution of the card command on the chip card. The classification of the card commands as critical commands is carried out preferably with reference to templates, in which all critical card commands are recorded. The templates are stored preferably in the chip card reader, in non-volatile memory (e.g., an EEPROM). Each card command is compared with the critical card commands contained in the template. If the card command is identified as a critical card command, the card command is only sent to the card if some qualifying event occurs. For example, the card holder may be required to confirm the transmission of the card command to the chip card. In this regard each key, or even several keys singly or in combination, can be defined as the confirmation key for security reasons.

Figure 1:
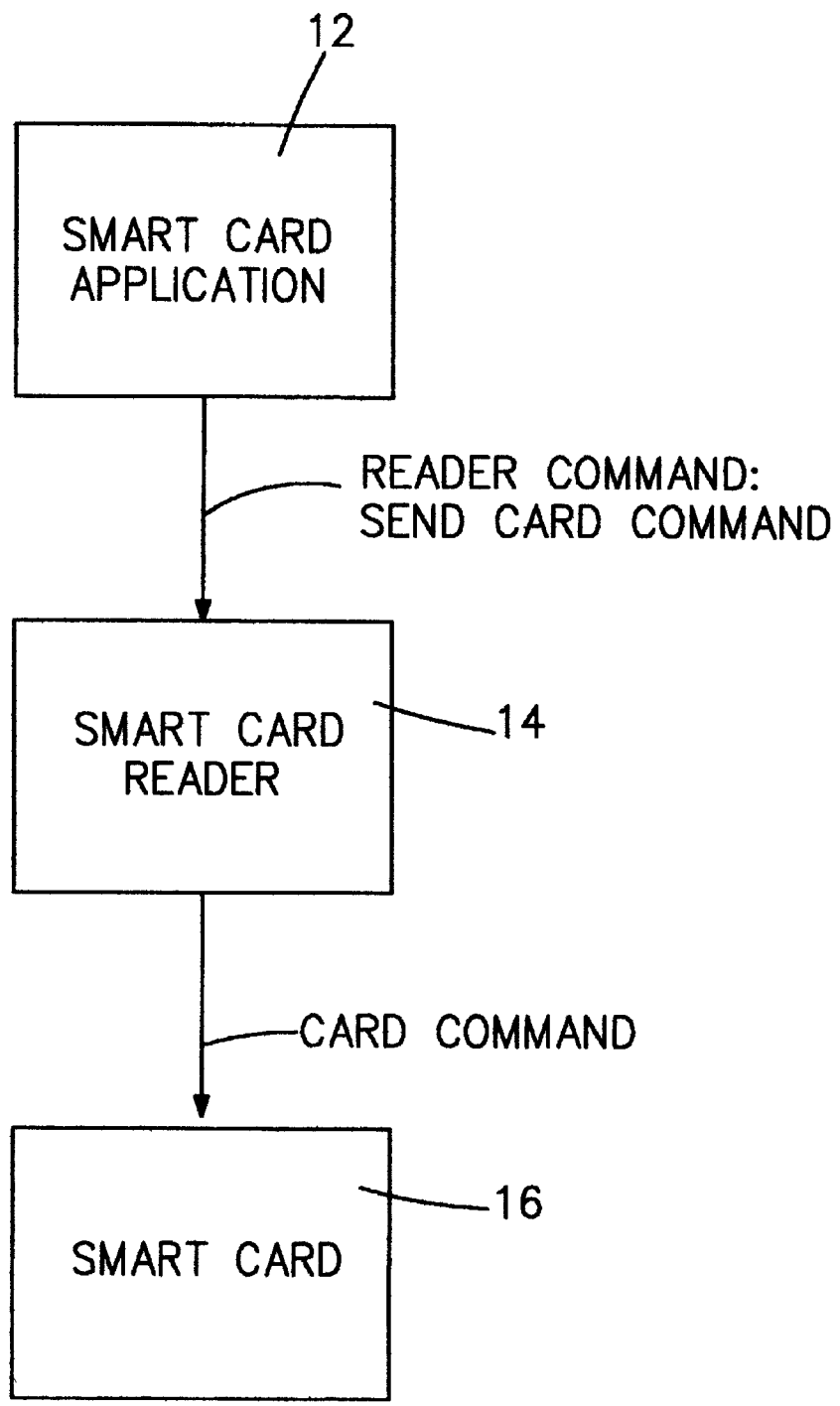
FIG. 1 shows communication between the chip card application, chip card reader and chip card in accordance with the prior art.
Figure 2:
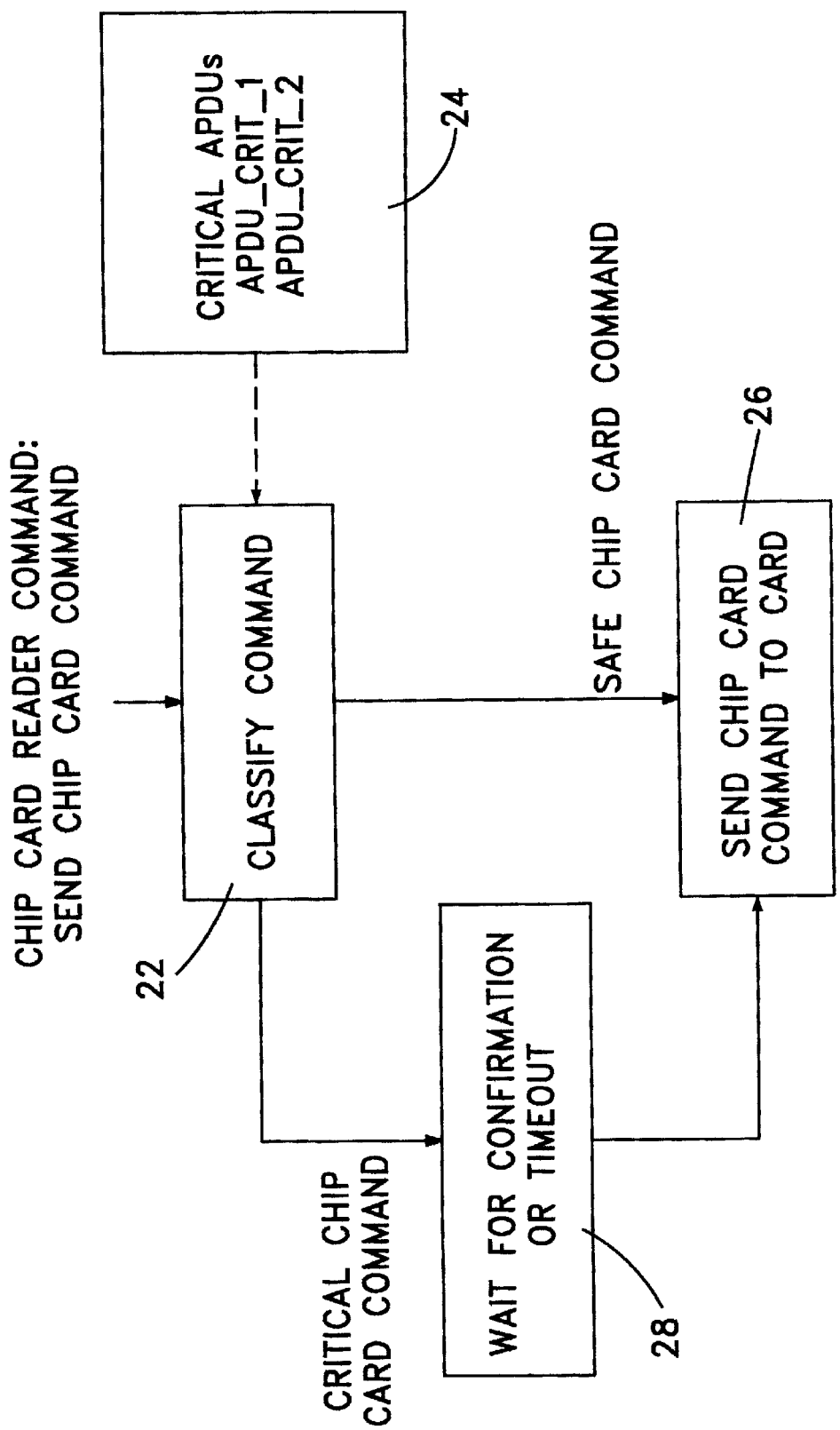
FIG. 2 shows the inventive filter function within the chip card reader.

FIG. 2 details the filter function of the present invention, in particular how the incoming card commands (so-called APDUs) are compared in step 22 with the comparison samples which are on file, such as the critical card commands/critical APDUs at 24. One of several methods of classification is illustrated below. For classification, the chip card reader contains a list of comparison samples and related masks for the critical APDUs in its non-volatile memory. If the command is classified, at step 22, as a safe (i.e., non-critical) card command, the system immediately send the chip card command to the card at 26. If, however, the command is identified as a critical chip card command, confirmation or timeout must occur at 28 prior to sending the command at 26. The task of the mask is to establish which area of the comparison sample is to be compared with the APDUs being executed. Each mask consists, for example, of a field of two bytes length followed by n bytes of mask.

FIG. 3 describes a special form of execution for comparing the mask 32 and the comparison sample 36. Only the first and third bytes are relevant for the comparison. The complete second byte is masked out by the mask in this area. Since the length of the data to be compared is restricted to 3 bytes, all bytes from the fourth onwards can have any values. It is also possible to mask out only single bits with the mask. Each bit of the mask which is set to 1 represents a bit to be checked in the APDUs 34 to be executed. If all bits of the comparison sample 36 which are set to 1 in the mask are identical to the bits of the card command to be executed, then the card command is to be delayed. Otherwise the card command is deemed to be "safe" and can be sent unchanged to the card without confirmation or timeout.

A special embodiment of the present invention envisions that the masking out of areas which are not relevant from the APDU and comparison sample is effected by bitwise logical AND linking with the mask. The bits in the areas which are not relevant are therefor set to 0 in both the APDU and comparison sample prior to comparison, due to which no differences result during the ensuing comparison.

Figure 4:
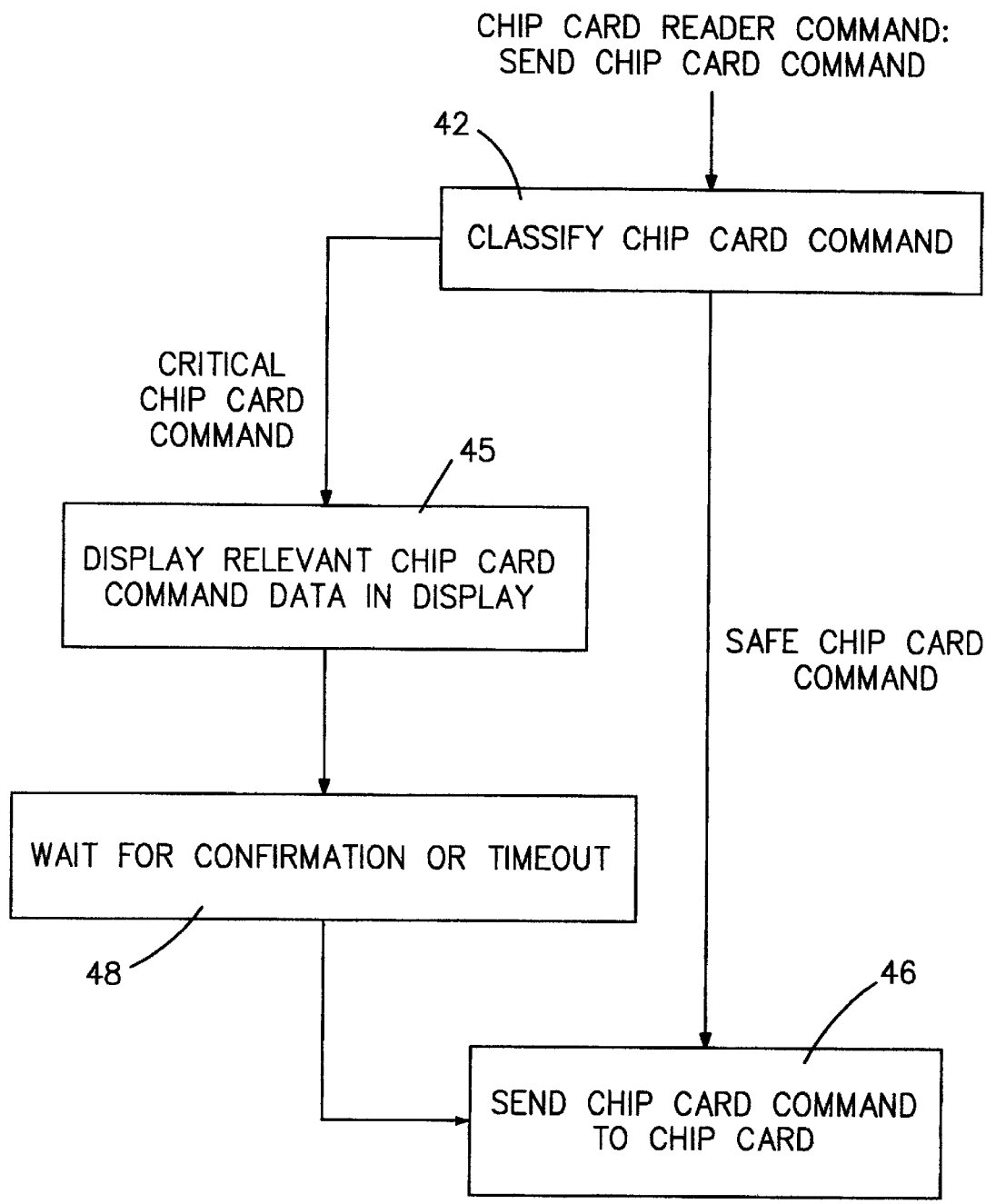
FIG. 4 shows a further execution variant of the filter function in accordance with FIG. 2.

A further form of execution of the present invention is depicted in FIG. 4. Here parts of the critical APDUs are shown on the display of the reader at 45, after the determination of classification at 42. For example, the amount of money to be debited from the chip card banking is displayed, so as to provide a further control option. This can, for example, be implemented by additional program code being assigned to the corresponding masks and comparison samples for the respective APDUs, which code takes over the visual display of certain areas of the APDUs.

The chip card reader prevents critical card commands from being able to reach (i.e., being sent at step 46) the card without confirmation by the user, as required at 48. Filtering of the messages takes place transparently for applications, such that all messages are transmitted with the aid of the same chip card reader command.

FIG. 5 describes a further execution variant of the present invention. This execution variant envisions that information on critical APDUs 56 is already contained on chip cards 54, which information is deposited on the chip card when it is manufactured, for example. Another option can consist in critical APDUs being able to be deposited with the aid of a key even after manufacture of the chip card. The APDUs are stored in one or a plurality of files or applets in the non-volatile area of the chip card and can be read out via certain card commands, but cannot be changed or deleted. When the card 54 is inserted into the reader 52, the reader reads information about critical APDUs from the card and adds this information to the list of masks with the related comparison samples. The critical APDUs 50 with their masks and related comparison samples are held preferably in the volatile memory of the chip card reader. When the card is removed from the reader, these data are automatically deleted by the reader.

The invention has been described with reference to several preferred embodiments. One having skill in the relevant art will recognise modifications which can be made without departing from the spirit and scope of the present invention as set forth in the appended claims.

What is claimed is:

1. A method for identifying and handling critical card commands of a chip card application, comprising the steps of:
   a) transmitting a card command to be executed to a comparison device prior to its execution;
   b) comparing the card command to be executed to defined comparison samples to identify critical card commands, said critical card commands comprising commands for at least one of monetary instructions and digital signature;
   c) executing the card command if the card command to be executed is not identified as a critical card command by said comparing;
   d) delaying of the card command to be executed if it corresponds to a comparison sample in the comparison device; and
   e) executing the card command to be executed which is identified as a critical card command by said comparing only if a pre-defined event occurs, said predefined event comprising execution of at least one user-defined user confirmation condition.

2. The method of claim 1, wherein the comparing is conducted by a comparison device which is part of a chip card reader.

3. The method of claim 1, wherein the comparison device is connected in one of incoming and outgoing series to a chip card reader.

4. The method of claim 1, wherein for each critical card command an identical comparison sample is filed.

5. The method of claim 1, wherein the comparison sample describes one or more defined areas of a critical card command.

6. The method of claim 1, further comprising assigning a mask to each comparison sample, the mask determining which areas of the comparison sample are to be compared with which areas of the card command to be executed.

7. The method of claim 6, further comprising, prior to the comparison, both Application Protocol Data Units and comparison sample are logically AND-linked bit by bit to the mask, in order to mask out areas of the card command and comparison sample which are not relevant.

8. The method of claim 6, wherein the mask consists of n bits, every bit of the mask which is set to 1 representing a bit to be checked in the comparison sample.

9. The method of claim 6, wherein the mask and the comparison sample have a same number of bits.

10. The method of claim 6, wherein the comparison samples with their related masks are filed in the non-volatile memory of the comparison device.

11. The method of claim 10, wherein, when a chip card is manufactured, the comparison samples with their related masks are filed in the non-volatile memory of the chip card and on activation of the chip card in a chip card reader, the comparison samples with their related masks contained on the chip card are loaded into the volatile memory of the chip card reader or the comparison device.

12. The method of claim 10, wherein the comparison samples with their related masks are filed write-protected in files or applets in the non-volatile memory of a chip card.

13. The method of claim 6, further comprising adding program code to the comparison samples with related masks in order to display visually on a display device data a critical card command identified by the comparison samples.

14. The method of claim 1, wherein the comparison sample includes class and instruction record byte of a card command.

15. The method of claim 1, wherein the comparison sample includes class and instruction record byte and following parameters bytes of a card command.

16. The method of claim 1, wherein the comparison samples are filed in a non-volatile memory of the comparison device.

17. The method of claim 16, wherein, when a chip card is manufactured, the comparison samples are filed in a non-volatile memory of the chip card and on activation of the chip card in the chip card reader, the comparison samples contained on the chip card are loaded into the volatile memory of the chip card reader or the comparison device.

18. The method of claim 16, wherein the comparison samples are filed write-protected in files or applets in the non-volatile memory of a chip card.

19. The method of claim 1, further comprising a step of displaying data of a card command identified by the comparison sample on a device for the visual display of information.

20. The method of claim 1, further comprising adding program code to the comparison samples in order to display visually on a display device data a critical card command identified by the comparison samples.

21. The method of claim 1, wherein the pre-defined event is a confirmation by a user by pressing one or more keys of a keyboard of a chip card reader.

22. A device for identifying and handling defined card commands, containing at least
   a) a non-volatile memory unit;
   b) a list of critical card commands, which can be filed in the non-volatile memory unit, said critical card commands comprising commands for at least one of monetary instructions and digital signature;
   c) a comparison device for identifying the critical card commands from the card commands to be executed with reference to the list;
   d) a confirmation device for releasing execution of an identified critical card command; and
   e) a communications device for producing and implementing communication between a chip card application and a chip card.

23. The device of claim 22, wherein the communications device is a chip card reader.

24. The device of claim 23, wherein the non-volatile memory unit is part of the chip card reader.

25. The device of claim 23, wherein the comparison device is part of the chip card reader.

26. The device of claim 22, wherein the confirmation device is part of a chip card reader.

27. The device of claim 26, wherein the confirmation device receives input from a keyboard.

28. A program storage device readable by machine, tangibly embodying a program of instructions executable by the machine to perform method steps for identifying and handling critical card commands of a chip card application, said method comprising the steps of:
   a) transmitting a card command to be executed to a comparison device prior to its execution;
   b) comparing the card command to be executed to defined comparison samples to identify critical card commands, said critical card commands comprising commands for at least one of monetary instructions and digital signature;
   c) executing the card command if the card command to be executed is not identified as a critical card command by said comparing;
   d) delaying of the card command to be executed if it corresponds to a comparison sample in the comparison device; and
   e) executing the card command to be executed which is identified as a critical card command by said comparing only if a pre-defined event occurs, said predefined event comprising execution of at least one user-defined user confirmation condition.

* * * * *